Dec. 11, 1951 O. R. SMITH 2,578,156
VEHICLE WITH DRIVE SHAFT COUPLED TO FORWARD
EXTREMITY OF ENGINES
Filed Jan. 24, 1947 4 Sheets-Sheet 1

INVENTOR.
Oliver Ross Smith
BY
Ashley & Ashley
ATTORNEYS

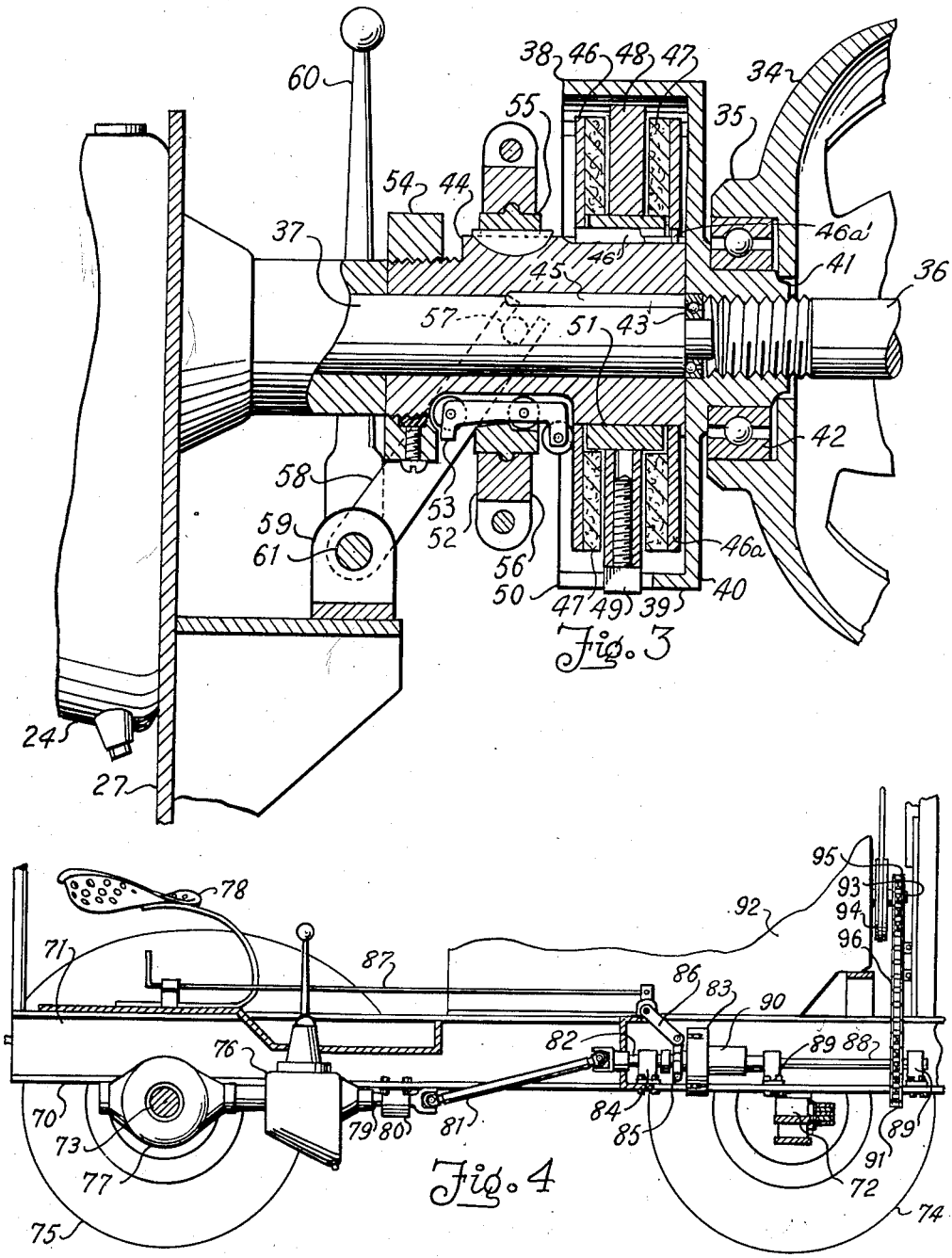

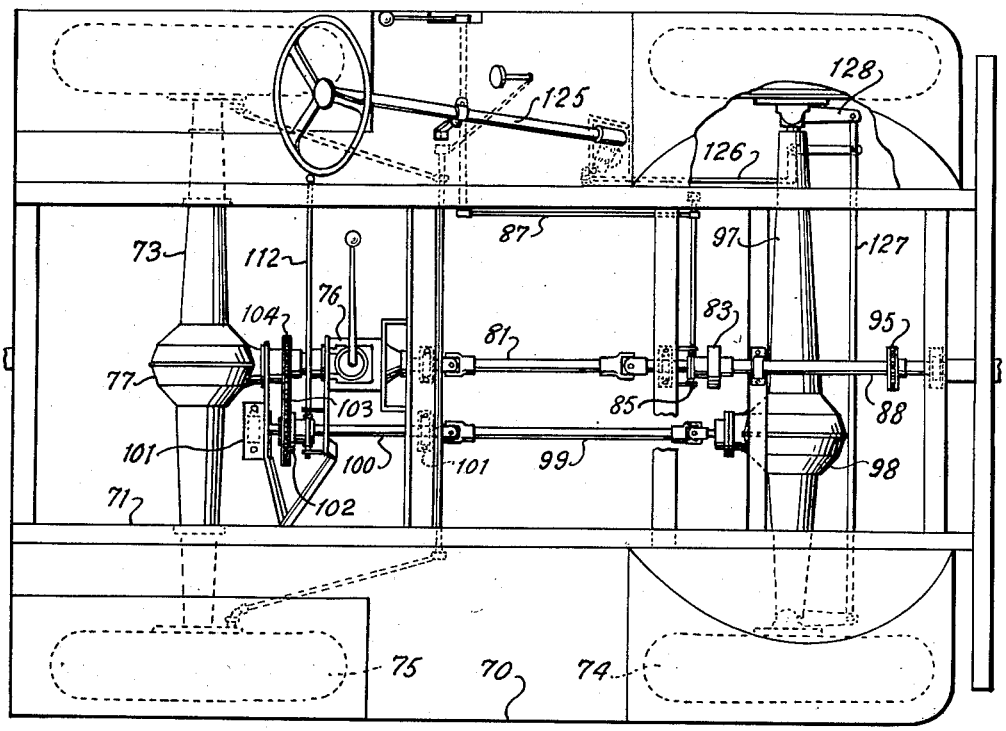
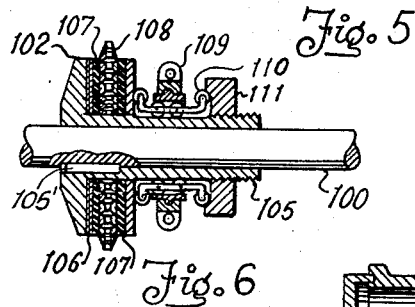
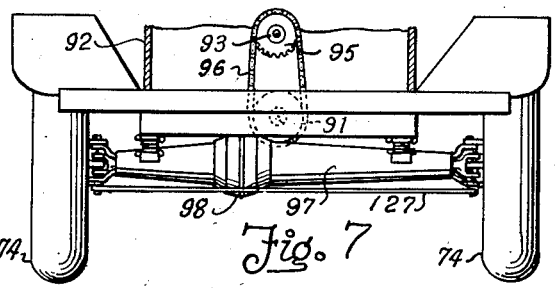
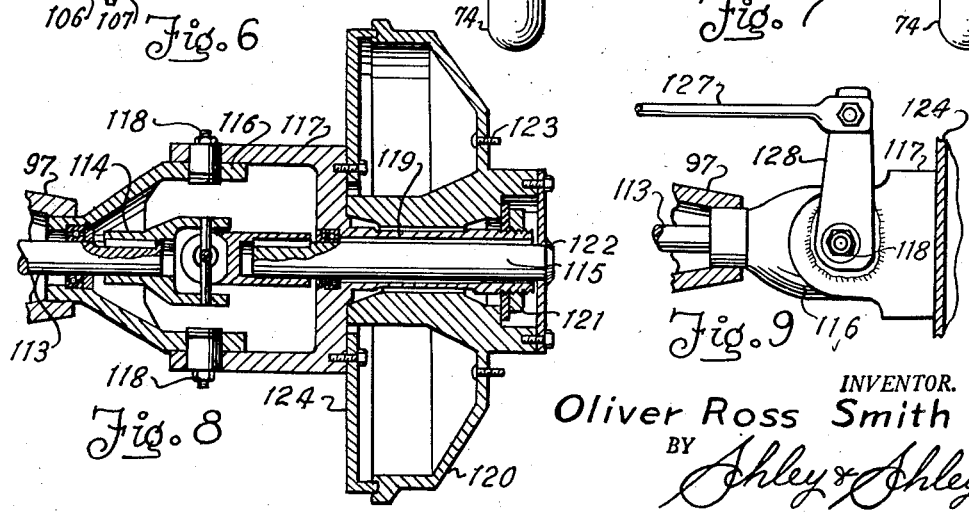

INVENTOR.
Oliver Ross Smith
BY Ashley & Ashley
ATTORNEYS

Patented Dec. 11, 1951

2,578,156

UNITED STATES PATENT OFFICE 2,578,156

VEHICLE WITH DRIVE SHAFT COUPLED TO FORWARD EXTREMITY OF ENGINES

Oliver Ross Smith, Fort Worth, Tex.

Application January 24, 1947, Serial No. 723,995

2 Claims. (Cl. 180—49)

This invention relates to new and useful improvements in vehicles and more particularly to self-propelled vehicles of the trailer type.

One object of the invention is to provide an improved vehicle of such construction as to be capable of being employed as a trailer for portably supporting various power driven mechanisms, such as, portable welding machines, air compressors, pumps, etc., and which, if desired, may be propelled by means of the mechanism supported thereon or its prime mover.

An important object of the invention is to provide an improved vehicle having means for transmitting power from a mechanism supported thereon to one or more sets of ground driving wheels without interfering with the normal operation of the mechanism.

A particular object of the invention is to provide an improved vehicle, of the character described, having clutch means interposed between its supported mechanism and driving wheels for rendering the same inoperative during the normal operation of the mechanism.

Another object of the invention is to provide an improved vehicle, of the character described, wherein the power transmitting means may have driving connection with the mechanism supported thereon or its source of power in accordance with the characteristics of the mechanism whereby the vehicle is adaptable for use with various mechanisms of different types.

A further object of the invention is to provide an improved vehicle, of the character described, wherein the power transmitting mechanism may have driving connection forwardly, rearwardly or laterally of the primer mover of the mechanism either independently of said mechanism or by means of the same.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a perspective view of a vehicle, constructed in accordance with the invention, having a power driven mechanism and its prime mover mounted thereon, Fig. 2 is a vertical, sectional view of the rear portion of the vehicle, showing the relation of its power transmitting means to the mechanism mounted thereon, Fig. 3 is an enlarged, vertical, sectional view, showing the connection between the power transmitting means and the mechanism, Fig. 4 is a longitudinal, vertical, sectional view of a modified form of vehicle, showing the power transmitting means connected to the forward end of the prime mover, Fig. 5 is a top plan view, having portions broken away, of a vehicle similar to the vehicle shown in Fig. 4 and having its power transmitting means connected to its front and rear wheels, Fig. 6 is a horizontal, cross-sectional view of the clutch connected in the front wheel power transmitting means, Fig. 7 is a front elevational view, partly in section, of the vehicle shown in Fig. 5, Fig. 8 is a transverse, vertical, sectional view, showing the connection of the power transmitting means to one of the front wheels, Fig. 9 is a bottom plan view, showing the connection of the steering mechanism to one of the front wheels, Fig. 10 is a perspective view of a portion of a modified form of vehicle, having its power transmitting means connected to the side of the prime mover.

Figure 1:
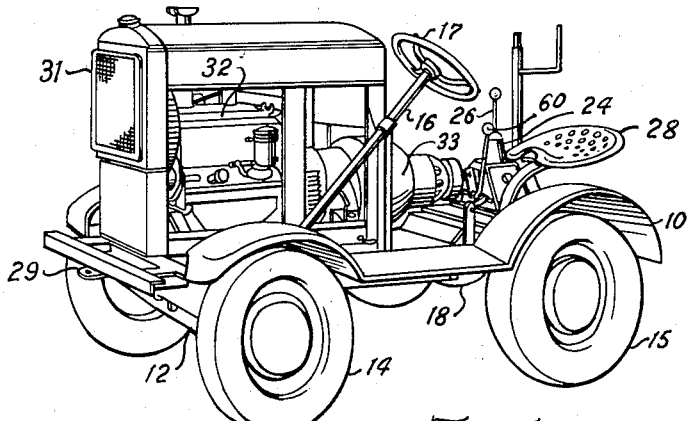

In the drawings, the numeral 10 designates a vehicle having a substantially rectangular chassis or frame 11 and front and rear axles 12 and 13 upon which suitable wheels 14 and 15, respectively, are mounted. The vehicle has an extremely short wheel-base and its front wheels 14 are adapted to be steered by the usual steering mechanism which includes a steering post 16 and wheel 17. As is most clearly shown in Fig. 2, a conventional differential 18 is connected to the rear axles 13 and has a suitable sprocket 19 mounted upon its rearwardly projecting drive shaft 20. The sprocket 19 is connected by an endless chain 21 to a similar sprocket 22 disposed above said sprocket 19 and carried by the rearwardly-projecting driven shaft 23 of a gear box or transmission 24. It is preferable to enclose the chain 21 and sprockets 19 and 22 in a suitable housing 25 which is secured to the frame 11.

The transmission 24 is of the usual construction, being actuated by a gear shift lever 26. For supporting the transmission above and to the rear of the differential 18, a mounting bracket 27 extends upwardly from the rear portion of the frame and preferably serves to enclose said transmission. A suitable seat 28 for the operator of the vehicle is secured to the frame to the left of the transmission. Due to the disposition of the transmission and seat adjacent the rear portion of the vehicle frame, ample space is provided at the forward end intermediate portions thereof for supporting portable mechanisms or machines and their prime movers without increasing the length of said frame. The short length of the vehicle is essential to its mobility over rough terrain. In order to permit towing of the vehicle or the towing of other vehicles, suitable hitches 29 and 30 are provided at the front and rear of the frame 11.

In Fig. 1, a power driven mechanism 31 is shown as mounted upon the forward portion of the vehicle frame and is of such length relative to said frame as to extend substantially beyond its intermediate portion. The mechanism 31 has been illustrated in the form of a portable welding machine, having a prime mover or engine 32 and a generator 33, but may be of an entirely different type, such as an air compressor or pump (not shown). In other words, the mechanism supported by the vehicle, in itself, forms no part of the present invention, and its construction is subject to variation. The essence of the invention is the provision of a relatively short vehicle for portably supporting mechanisms of various types capable of traveling over rough terrain and adapted to be towed or to utilize the power of the supported mechanism for self-propelling the same.

Figure 2:
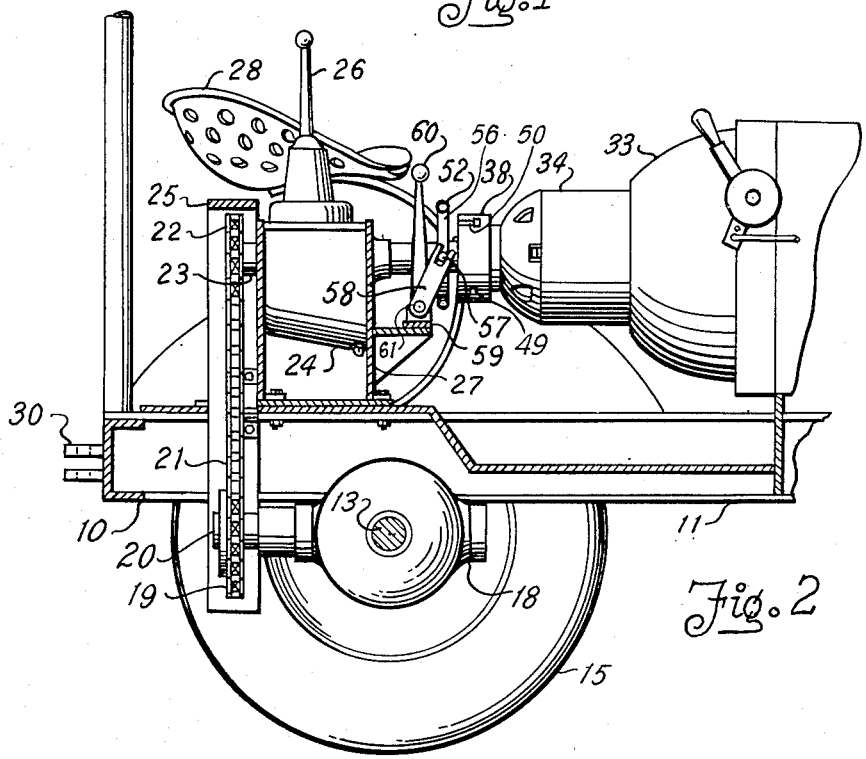

As is most clearly shown in Figs. 2 and 3, the generator 33 has its rear end terminating adjacent the transmission 24 and is provided with an adapter 34 having an annular boss 35 surrounding its armature shaft 36. The transmission has a forwardly-projecting drive shaft 37 disposed in axial alinement with the generator shaft 36 with its forward extremity adjacent the rear end of said shaft 36. A friction disk clutch 38 is carried by the transmission shaft 37 and includes an annular housing 39 having a forward end or closure plate 40 disposed contiguous the adapter boss 35. The plate 40 is connected to the generator shaft 36 by an axial collar 41 which is screw-threaded upon said shaft and which is supported within the adapter boss by a suitable ball bearing assembly 42. Thus, the clutch housing 39 is freely rotatable with and driven by rotation of the generator shaft. For supporting the transmission shaft, a ball bearing assembly 43 is confined upon the reduced forward end thereof within the bore of the collar 41. A cylindrical hub 44 is keyed or otherwise secured to the transmission shaft as shown by the numeral 45 and has its forward portion disposed within the clutch housing. Suitable clutch plate 46 is slidably mounted upon the forward portion of the hub 44 as shown by the numeral 46' and a plate 46a is rigidly secured to hub 44, as by a key or other means 46a' as shown in Fig. 3. Friction elements or disks 47 are confined therebetween. Interposed between the friction disks 47 is a third clutch plate or head 48 which is connected to the clutch housing 39 by radial projections or bolts 49 engaging within slots 50 formed in the external periphery of said housing. The clutch head 48 is freely rotatable relative to the hub 44 and is preferably spaced from said hub by an internal bearing ring 51 which is confined between the plates 46. The disks 47 also encircle the bearing ring and may be carried by the plates or be rotatable relative to the hub. It is pointed out that the combined thickness of the disks 47 and head 48 is greater than the length of the bearing ring 51 to provide spaces between the plates 46 and 46a and said ring so as to permit the free rotation of said clutch head.

For slidably confining the clutch elements upon the hub 44, a suitable actuator 52 is keyed or otherwise secured to the intermediate portion of said hub and includes a plurality of rollers on rolling keys 53 for engaging the rearmost plate 46. A suitable collar or nut 54 is threaded upon the hub for confining the rolling keys 53 in place. The roller keys 53 slidably support an inner ring 55 upon which a sectional or split ring 56 is rotatably mounted. As is most clearly shown in Fig. 2, external lugs 57 are formed on the outer surface of the split ring 56 and are adapted to be engaged by the arms of a yoke 58 which is pivotally supported by a suitable bracket 59. For pivoting the yoke so as to slide the actuator 52, relative to the hub, an upright lever 60 is connected to the yoke by a transverse rod 61. Since the inner ring 55 is rotatably mounted in the outer ring 56 of the actuator, said inner ring and the rolling keys 53 may rotate relative to said outer ring and the yoke 58.

Whenever it is desired to propel the vehicle by means of the prime mover of the mechanism supported thereupon, such as the engine 32 of the welding machine 31, the lever 60 is swung forwardly so as to pivot the yoke 58 forwardly and thereby move the actuator 52 toward the clutch housing 39. The rolling keys 53 are urged forwardly by this movement of the actuator into positive engagement with the rearmost plate 46. Since the bearing ring 51 is of less length than the combined thickness of the friction disk 47 and clutch head 48, the rearmost plate 46 is slid forwardly so as to clamp said disks in frictional engagement with said clutch head. Due to the constant rotation of the clutch head by its connection with the clutch housing 39, such rotation is imparted to the hub 44 and the shaft 37 for driving the transmission 24 which, in turn, drives the differential 18 and the rear axles 13. It is pointed out that the clutch 38 may be released to permit shifting of the lever 26 whenever it is desired to vary the speed transmitted by the transmission. Upon release of the clutch, only the clutch housing and its connected plates are rotated by the generator shaft 36. Thus, there is no interference with the normal operation of the generator.

Due to the nature of the mechanism to be supported by the vehicle, it is frequently desirable to obtain the power for propelling said vehicle from the forward end of the prime mover of said mechanism. In Fig. 4, a modified form of vehicle 70 is shown, being similar to the vehicle 10, and having a similar frame 71, front and rear axles 72 and 73, front and rear wheels 74 and 75, transmission 76 differential 77 and seat 78. It is noted that the transmission 76 is disposed forwardly of the differential 77 in substantial alinement therewith and is connected directly thereto. The transmission has its drive shaft 79 suspended from the vehicle frame 71 by a self-alining roller bearing assembly 80. A universal drive shaft 81 connects the transmission shaft 79 to a stub-shaft 82 upon which a friction disk clutch 83, similar to the clutch 38, is mounted, the stub-shaft being supported upon the frame 71 by a suitable bearing assembly 84. The clutch 83 includes an actuator 85 which is adapted to be reciprocated relative to said clutch by a pivoted yoke 86 and an elongated operating rod or a lever 87. A second drive shaft 88, supported by suitable bearings 89 forwardly of the clutch, is connected to the housing of said clutch as shown by the numeral 90. The shaft 88 is adapted to be driven by the prime mover of the mechanism supported by the vehicle and has a drive sprocket 91 mounted thereon.

The mechanism is indicated generally by the numeral 92 and the prime mover of said mechanism has the forward end of its crankshaft 93 exposed in the usual manner for receiving one or more drive pulleys 94. A suitable sprocket 95 is mounted upon the exposed forward end of the crankshaft 93 and is drivingly connected to the sprocket 91 by an endless chain 96. In this manner, the sprocket 91, shaft 88 and clutch housing 90 are constantly driven upon rotation of the crankshaft 93 and sprocket 95. Upon forward movement of the actuator 85, the clutch 83 is engaged, in the same manner as the clutch 38, so as to transmit the rotation of the shaft 88 to the shafts 82, 81 and 79 and thereby drive the transmission 76. When the clutch is released, its housing together with the shaft 88 and sprocket 91 are the only portions of the drive connection which are rotated by operation of the prime mover.

In Figs. 5 to 9, the vehicle 70 is shown provided with a four-wheel drive assembly which includes forward axle housings 97 and a differential 98. A universal shaft 99 extends parallel to the universal shaft 81 and connects the forward differential 98 to a drive shaft 100 which is rotatably supported by suitable bearings 101 adjacent and to one side of the transmission 76. The shaft 100 carries a friction disk clutch 102 and this clutch is connected by an endless chain 103 to a sprocket 104 interposed between the transmission 76 and the rear differential 77. As is clearly shown in Fig. 6, the clutch 102 is similar to the clutches 38 and 83 and includes a flanged hub 105 which is keyed or otherwise secured to the shaft 100 as shown by the numeral 105'. Slidably and rotatably mounted upon the hub 105 are a pair of clutch plates 106 having friction disks 107 confined therebetween. A sprocket 108 is interposed between the friction disks 107 and functions as a clutch head or plate for transmitting rotation to the clutch and the shaft 100. The clutch 102 includes an actuator 109 which is slidably supported upon the hub 105 by rolling keys 110 and is confined thereupon by means of a suitable nut or retaining collar 111 screw-threaded upon the forward end of said hub. The actuator 109 is reciprocated longitudinally of the clutch hub by a suitable linkage 112. Upon rearward movement of the actuator, the plates 106 are slid rearwardly toward the flange of the clutch hub so as to clamp the friction disks 107 in frictional engagement with the sprocket 108 and thereby establish a driving connection between the shaft 100 and the sprocket 104. Upon release of the clutch, the sprocket 108 is free to rotate relative to the other elements of the clutch 102.

As is most clearly shown in Figs. 8 and 9, each front axle housing 97 has a drive shaft 113 rotatably supported therein and connected by a universal joint 114 to a floating shaft 115 for transmitting rotation from the front differential 98 to the front wheels 74. To support the front wheels, a yoke 116 is formed on the outer end of each axle housing and has a U-shaped bracket 117 pivotally connected thereto by suitable pins 118. The U-shaped bracket 117 has a cylindrical sleeve 119 made integral therewith for receiving and rotatably supporting the floating shaft 115. A conventional brake drum or housing 120 is rotatably supported upon the sleeve 119 and is confined thereupon by a suitable nut 121 which is screw-threaded upon the outer end of said sleeve. The floating shaft 115 is connected to the drum 120 by a plate 122 which is secured to the outer end of said shaft and bolted to said drum. The wheels 74 are adapted to be fastened to their respective drums by means of suitable bolts 123 and said drums coact with a conventional brake flange 124 preferably bolted to the bracket 117 in surrounding relation to the floating shaft and the inner portion of the drum. By means of this construction, rotation of the axle shaft 113 is transmitted by the universal joint 114, floating shaft 115 and plate 122 to the brake drum 120 to which the wheels 74 are secured by the bolts 123. Due to the provision of the universal joint, the wheels may be steered or turned without interfering with the rotation of said wheels.

The steering mechanism of the vehicle is of conventional construction and includes the usual steering post 125, linkage 126 and tie rod 127. As is most clearly shown in Fig. 9, the tie rod 127 has its ends pivotally connected to arms 128 which are preferably made integral or otherwise secured to the lower legs of each U-shaped bracket 117. By rotation of the steering post 125 in the usual manner, the arms 128 and their brackets 117 are pivoted relative to the yoke 116 so as to turn the front wheels 74 of the vehicle.

Figure 10:
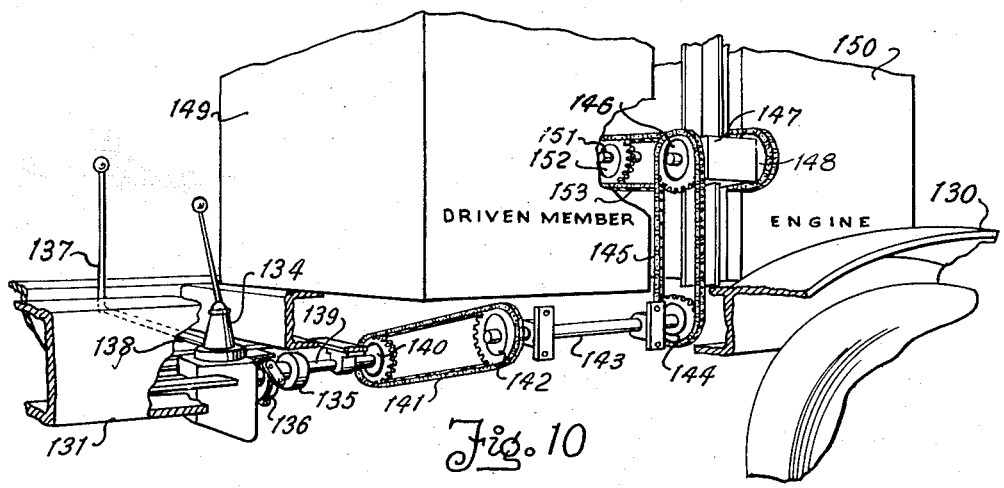
Figure 11:
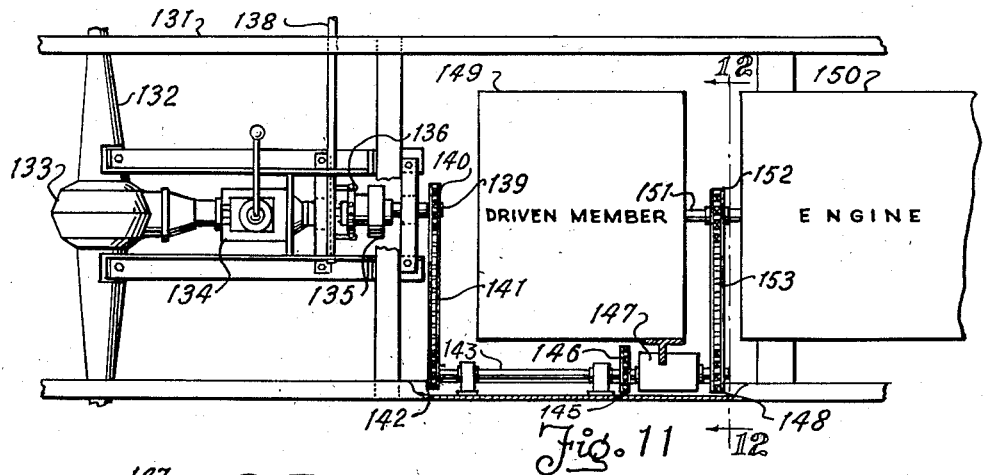
Fig. 11 is a top plan view of a portion of the vehicle shown in Fig. 10.
Figure 12:
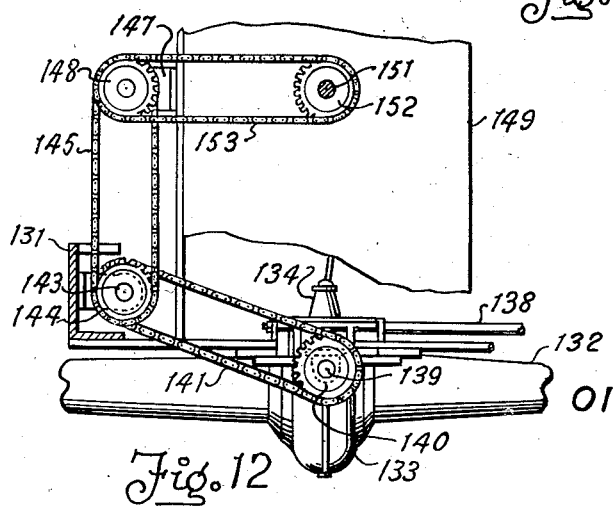
Fig. 12 is a transverse, vertical sectional view, taken on the line 12—12 of Fig. 11.

In Figs. 10, 11 and 12, a further modified form of vehicle 130 shown and includes a frame or chassis 131 having the usual rear axles 132 and differential 133. A transmission 134 is mounted forwardly of and connected directly to the differential 133, while a friction disk clutch 135 is disposed forwardly of the transmission and has an actuator 136 associated therewith. The clutch and actuator are substantially identical to the clutch 38 and the actuator 52, being operated by means of a lever 137 and transverse rod 138 which are similar to the lever 60 and rod 61 of the first form of the invention. A stub shaft 139 is connected to the housing of the clutch 135 and projects forwardly thereof for receiving a sprocket 140 which is driven by an endless chain 141 and a sprocket 142. The latter is carried by the rear end of a longitudinal drive shaft 143, disposed adjacent one side of the frame 131 and having a similar sprocket 144 mounted on its forward end. An endless chain 145 drivingly connects the sprocket 44 to a sprocket 146 disposed thereabove and this sprocket is connected by a jaw clutch 147 to a similar sprocket 148.

The mechanism supported by the vehicle 130 includes a driven member 149 and its engine or prime mover 150, the latter being disposed forwardly of the driven member and being drivingly connected thereto by a suitable shaft 151. In order to provide a side or lateral power take-off, a sprocket 152 is carried by the shaft 151 between the engine and the driven member. Due to the provision of the sprocket 148, power may be transmitted from the sprocket 152 by means of an endless chain 153 which passes over said sprockets. Upon engagement of the clutch 135, power is transmitted from the engine 150 to the transmission 134 and from said transmission to the differential 133 and rear axles 132. In order to eliminate the necessity of constantly driving all of the elements of the drive connection, the jaw clutch 147 may be disengaged during normal operation of the mechanism whereby only the chain 153, the sprocket 148 and one jaw of said clutch is driven by the engine 150.

From the foregoing, it is believed to be readily apparent that a simple vehicle for portably supporting power driven mechanisms has been provided. The wheel base of the vehicle is sufficiently short to permit travel of the same over rough or irregular terrain and facilitates the hauling or transporting of the same whenever desirable or necessary. As has been pointed out, the vehicle may be towed or may be self-propelled by utilizing the power developed by the prime mover of the mechanism supported by said vehicle. This power may be obtained through the driven member of the mechanism or directly from the front or side of the prime mover. In addition, the vehicle may have a conventional rear wheel drive or may be provided with an auxiliary front wheel drive whereby the vehicle may be driven solely by the rear wheels or by all four wheels.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A vehicle having a prime mover removably mounted thereon including, a frame supporting the prime mover, front and rear axles supporting the frame, ground wheels rotatably moved on the axles, a differential connected in the rear axle, a transmission mounted on said frame and adjacent the rear thereof and having driving connection with the differential, a clutch mounted on said frame and having a driven member connected with the transmission, the clutch having a driving member engageable with the driven member, a drive connection extending forwardly from said clutch driving member and longitudinally of said frame beneath the prime mover, and means detachably connecting the last-named drive connection to the forward portion of said prime mover.

2. A vehicle as set forth in claim 1 including, a differential connected in the forward axle, a second drive connection operatively secured to and extending rearwardly from the forward differential and longitudinally of the frame beneath the mechanism, and clutch means releasably connecting the second drive connection to the first-named driving connection between the rear differential and transmission.

OLIVER ROSS SMITH.

REFERENCES CITED

The following references are of record in the file of this patent:

UNITED STATES PATENTS

| Number | Name | Date |
|---|---|---|
| 1,350,668 | Oversmith | Aug. 24, 1920 |
| 1,536,081 | Dean | May 5, 1925 |
| 1,592,970 | Dernier | July 20, 1926 |
| 1,623,221 | Weimer | Apr. 5, 1927 |
| 2,062,532 | Smalley | Dec. 1, 1936 |
| 2,075,564 | Alden | Mar. 30, 1937 |
| 2,232,992 | Alexander | Feb. 25, 1941 |
| 2,244,063 | Hobart | June 3, 1941 |
| 2,280,357 | Spase | Apr. 21, 1942 |
| 2,329,916 | Lamb et al. | Sept. 21, 1943 |
| 2,352,301 | Welles | June 27, 1944 |
| 2,375,205 | Barras | May 8, 1945 |

FOREIGN PATENTS

| Number | Country | Date |
|---|---|---|
| 824,285 | France | Nov. 3, 1937 |